United States Patent [19]

Hoban

[11] Patent Number: 4,750,778
[45] Date of Patent: Jun. 14, 1988

[54] PICKUP TRUCK CONVERTIBLE HARD TOP/JUMP SEAT

[76] Inventor: Edward Hoban, 170 Cranford Pl., Teaneck, N.J. 07666

[21] Appl. No.: 89,078

[22] Filed: Aug. 25, 1987

[51] Int. Cl.⁴ ............................................. B60N 1/02
[52] U.S. Cl. ...................................... 296/66; 296/63; 296/107; 296/216
[58] Field of Search .............. 296/103, 107, 124, 125, 296/128, 210, 216, 218, 147, 63, 66, 69, 64, 65 R, 99 R, 99 A

[56] References Cited

U.S. PATENT DOCUMENTS

| | | | |
|---|---|---|---|
| 1,819,545 | 8/1931 | Delp | 296/66 X |
| 2,007,873 | 7/1935 | Paulin | 296/107 X |
| 3,703,310 | 11/1972 | Lystad | 296/66 X |
| 3,840,263 | 10/1974 | Bowden | 296/64 X |
| 3,954,296 | 5/1976 | Patnode | 296/99 A X |
| 4,103,961 | 8/1978 | Cerf et al. | 296/99 A X |
| 4,480,868 | 11/1984 | Koto | 296/190 |

FOREIGN PATENT DOCUMENTS

| | | | |
|---|---|---|---|
| 38051 | 10/1928 | France | 296/99 R |
| 397232 | 8/1933 | United Kingdom | 296/99 R |

*Primary Examiner*—Robert B. Reeves
*Assistant Examiner*—Russell D. Stormer
*Attorney, Agent, or Firm*—Richard C. Litman

[57] ABSTRACT

An improvement in pickup trucks whereby two or three seat pickups may be transformed into four or five seat pickup truck convertibles. The invention consists of a modified pickup truck cab section that doubles as a rearwardly facing jump seat and a truck bed that offers a mechanism to secure the jump seat in place and a passenger restraint for those riding in the jump seat. The device facilitates the conversion without the use of additional parts or frame reinforcements.

6 Claims, 3 Drawing Sheets

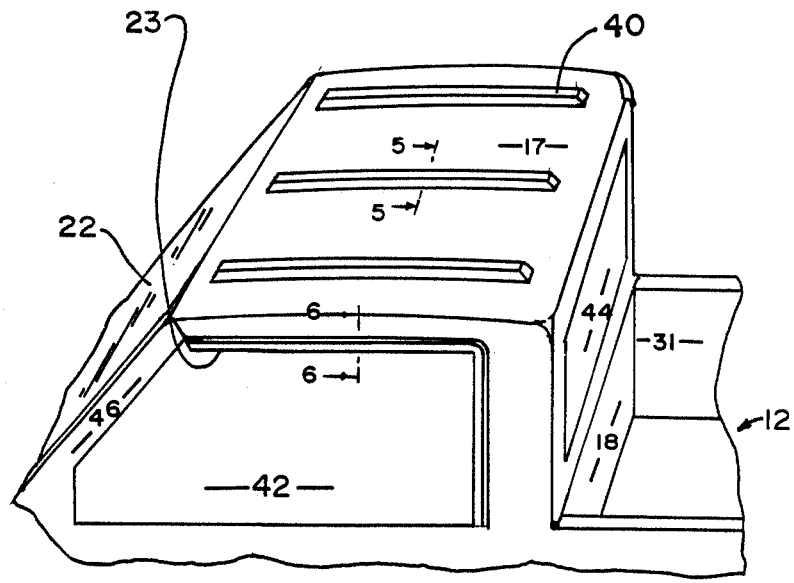
Fig. 4
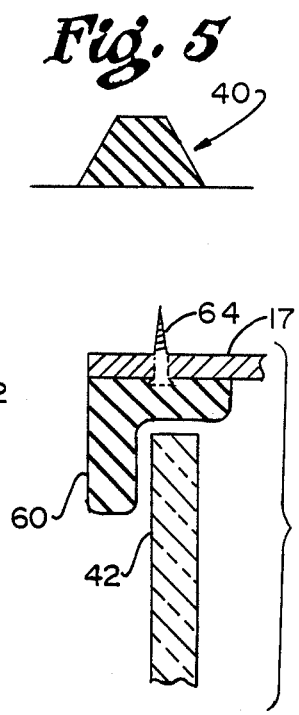
Fig. 5
Fig. 6
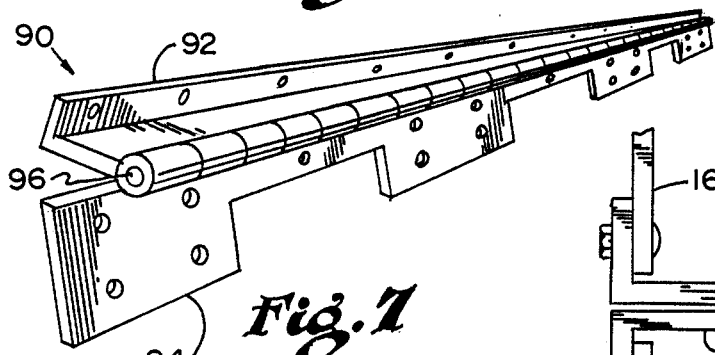
Fig. 7
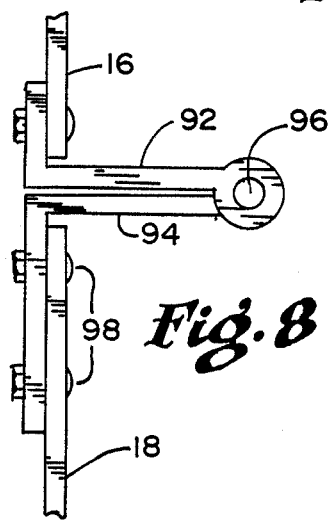
Fig. 8
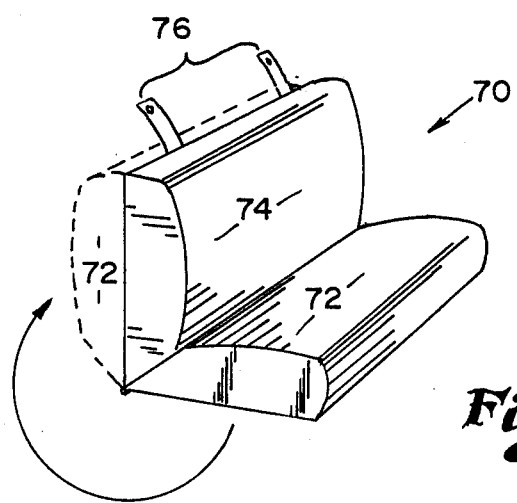
Fig. 9

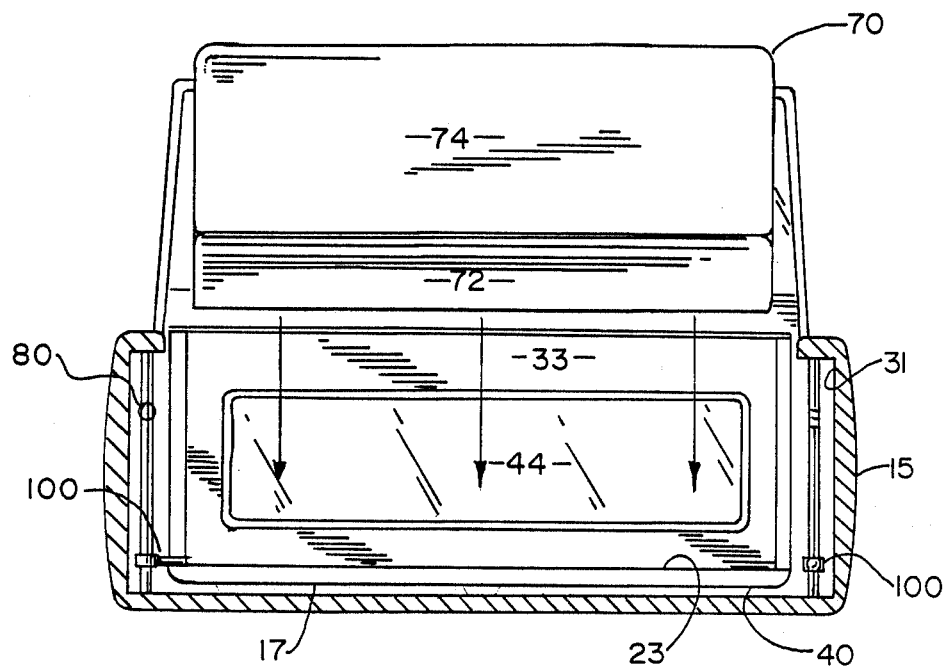
Fig. 10
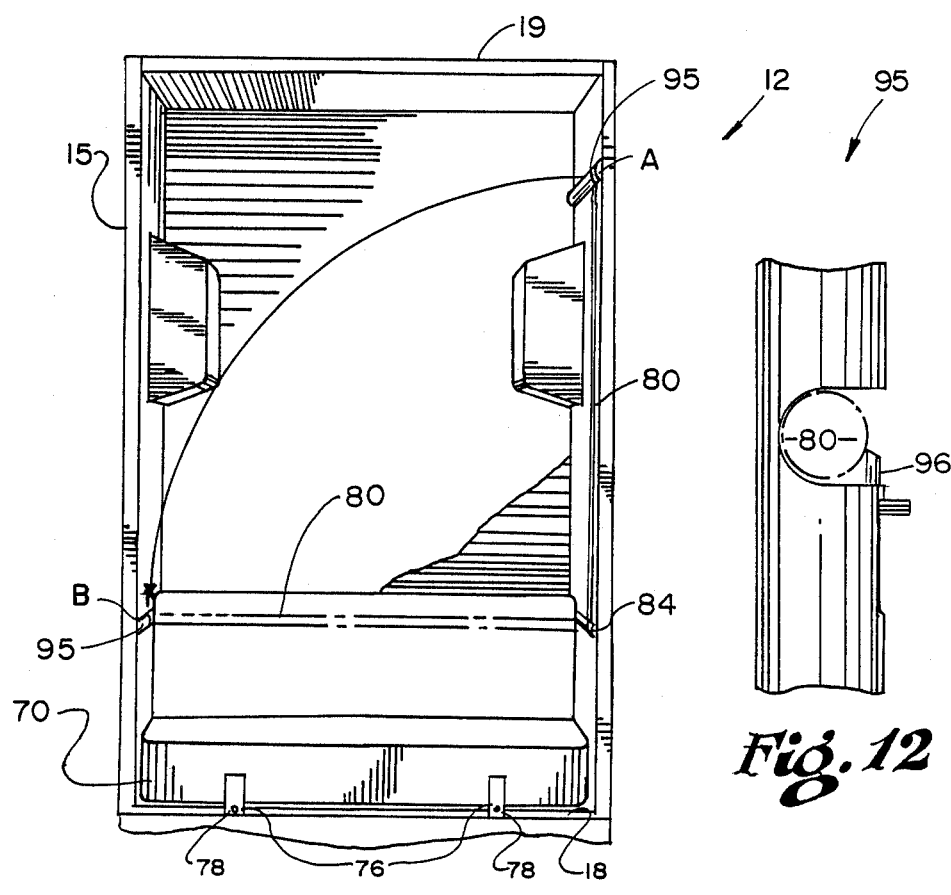
Fig. 11
Fig. 12

PICKUP TRUCK CONVERTIBLE HARD TOP/JUMP SEAT

BACKGROUND OF THE INVENTION

1. Field of the Invention

The present invention relates to a system which modifies a pickup truck cab section to allow the hard top to fold into the truck bed and double as a rearwardly facing jump seat. Once the hard top is folded down, passengers may be secured in the jump seat using a safety bar which is swingably attached to the side of the truck bed.

The invention can be utilized on a variety of pickup truck designs. The method of construction and utilization of the invention is more fully described herein.

2. Description of the Prior Art

Various prior art convertible truck/auto bodies and the like, as well as their apparatuses and methods of construction in general, are known and found to be exemplary of the U.S. prior art. They are:

| U.S. Pat. No. | Inventor |
| --- | --- |
| 1,047,016 | H. H. Elwood |
| 1,410,139 | J. Tavelli |
| 1,766,015 | W. Dupre |
| 4,139,232 | D. B. Cerf |
| 4,238,876 | Monroe et al |
| 4,335,916 | D. R. Gutgsell |
| 4,480,868 | Masaaki Koto |
| 4,595,230 | B. A. Russell et al |
| 4,623,187 | Aftab Ibrahim |

U.S. Pat. No. 1,766,015, issued to Dupre, discloses a convertible automobile body providing a rear area which folds into a seat.

U.S. Pat. No. 4,238,876, issued to Monroe et al, discloses a method for converting a vehicle manufactured with a hard top to a vehicle having a removable top. Also disclosed are sealing and mounting devices for securing and sealing the top to the vehicle body.

U.S. Pat. No. 4,480,868, issued to Kato, discloses a motor truck body comprising a truck bed and a cabin whereby the cabin has an upper and lower panel in its rear wall. The upper panel opens to an upright position and the lower panel is provided with a seat cushion which opens and engages the floor panel segment of the truck bed to form an auxiliary seat. However, no means are incorporated in the Koto patent to convert the top of the cabin into a seat.

U.S. Pat. No. 4,623,187, issued to Ibrahim, discloses a pickup truck insert for fitting into the bed of a pickup truck. The insert includes a forward and rearward sitting area.

These patents or known prior uses teach and disclose various types of rumble seats and combined attachments of various manufactures and the like, as well as their methods of construction. However, none of them, whether taken singly or in combination, disclose the specific details of the combination of the invention in such a way as to bear upon the claims of the present invention.

SUMMARY OF THE INVENTION

An object, feature and advantage of this invention is to provide a novel mechanism that is safe, cost-effective, efficient in use and that facilitates the transformation of two or three seat pickup trucks into four or five seat pickup truck convertibles.

Another object of the invention is to provide a novel and improved construction whereby the transformation means is incorporated therein, allowing the above conversion to occur without the use of additional parts, metal reinforcements or the like.

These, together with other objects and advantages of the invention reside in the details of the process and operation thereof, as is more fully hereinafter described and claimed. References are made to drawings forming a part hereof, wherein like numerals refer to like parts throughout.

DESCRIPTION OF THE SEVERAL VIEWS OF THE DRAWINGS

FIG. 4 is a perspective view of the cab of a pickup truck illustrating the construction of the invention according to a preferred embodiment.

FIG. 5 is a cross section view taken along line 5—5 of FIG. 4.

FIG. 6 is a cross section view taken along line 6—6 of FIG. 4.

FIGS. 7 and 8 are front perspective and side views, respectively, illustrating the construction and embodying concepts of an element of the invention.

FIG. 9 is a front perspective view of an element of the invention.

FIG. 10 is a front perspective view of an element of the invention illustrating its construction and embodying concepts.

FIG. 11 is a top plan view of the invention illustrating its construction according to a preferred embodiment and best mode of operation.

FIG. 12 is a side plan view of an element of the invention illustrating its construction and embodying concepts.

DESCRIPTION OF THE PREFERRED EMBODIMENT OF THE INVENTION

Figure 1:
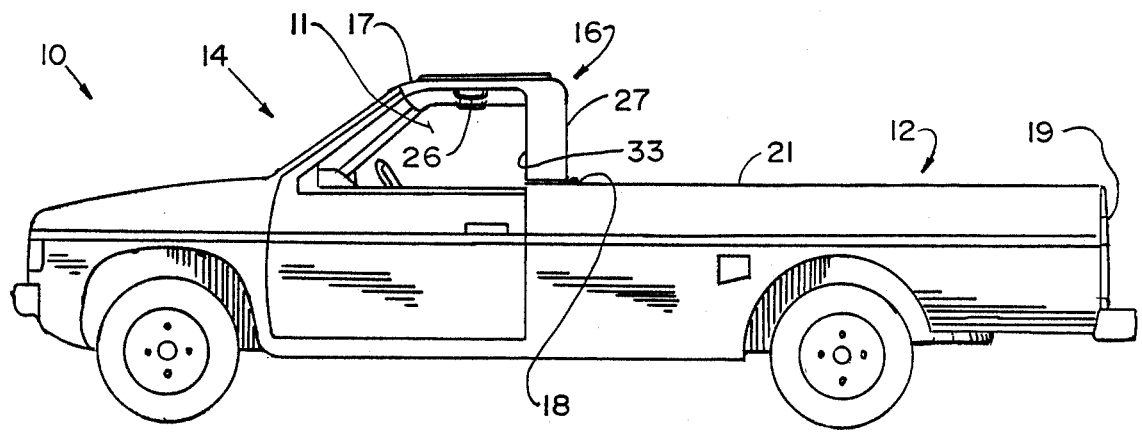
FIG. 1 is a side plan view of a pickup truck illustrating its various parts.
Figure 2:
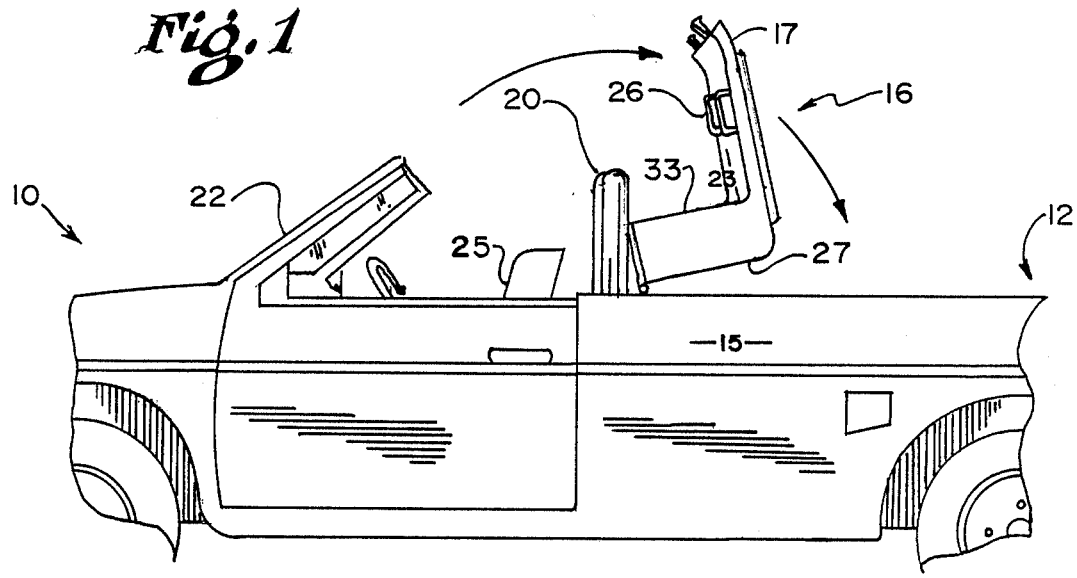
FIGS. 2 and 3 are side plan views of the pickup truck illustrating the concepts of the invention according to a preferred embodiment and best mode of operation.
Figure 3:
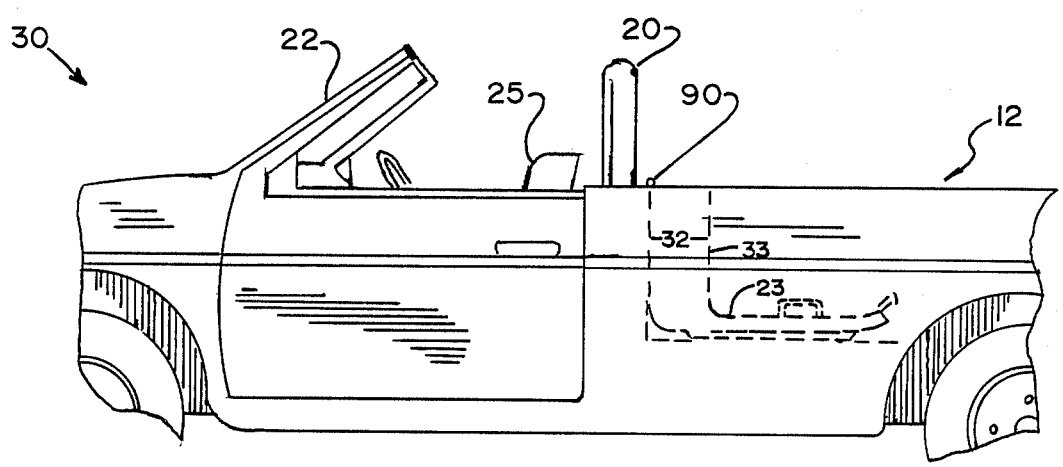

Now referring to the drawings, it is shown in FIGS. 1, 2, and 3 a typical design of a pickup truck 10 having a truck cap 14 and truck bed 12. The truck bed 12 normally used for hauling materials consists of a front surface 18, side surface 15, top ledge 21, inner side surface 31 and a rear drop lid 19. The pickup truck cab 14 has as its components the engine compartment 13, passenger area 11 and cab top 16. The cab top 16 further comprises a horizontally displaced outer surface 17, a horizontally displaced inner surface 23 and a rear vertically displaced section having an inner body 33, outer surface 27 and a window 44 disposed therein.

The present invention modifies the pickup truck cab section 14 such that a two or three seat pickup truck 10 may be transformed into a four or five seat pickup truck convertible 30. This is accomplished by allowing the cab top 16 to fold into the truck bed 12 and double as a rearwardly facing jump seat 32 such that the vertically displaced inner surface 33 of the cab top 16 serves as the backrest for the jump seat 32 and the horizontally displaced inner surface 23 of the cab top 16 serves as the seat for the jump seat 32.

The cab top 16 is disconnected from the windshield 22 by unlocking the fasteners 24 which are located on the rubber-sealed forward portion of the cab top 16. Once disconnected, the cab top 16 may be lowered into the truck bed 12 by using the plastic or metal handles 26 affixed above the window openings within the passenger compartment 11. Also located within the pickup truck cab 14 is a steel roll bar 20 which is permanently mounted behind and at the rear corners of the front seat 25. It fills existing space at extreme inner corners of the pickup truck cab 14 and, once the cab top 16 is lowered, the roll bar 20 also affords roll protection and support for seat belt shoulder straps.

As best seen in FIGS. 4, 5 and 6, the horizontally displaced outer surface 17 of the cab top 16 has long, sturdy, laterally displaced, plastic or hard rubber buffer strips 40. The buffer strips 40 support and protect the surface 17 when it is lowered onto the truck bed 12.

A foam rubber or plastic strip 60 is attached along the edges of the cab top 16 using the screws 64. When the cab top 16 is up, the foam rubber strip 60 will aid in limiting the upward travel of the side windows 42 and seal out leaks or drafts. When the cab top 16 is lowered onto the truck bed 12 to serve as a jump seat 32, the foam rubber strip 60 protects passengers riding in the jump seat 32 from metal edges that may be present. The side windows 42 are also limited in upward travel by the front windshield frame 46 while the cab top 16 is lowered.

As detailed in FIGS. 7 and 8, a hinge 90 is placed at the midpoint between the truck bed 12 and the cab top 16. The hinge 90 consists of an upper strip 92 which is attached to the cab top 16 and a lower strip 94 which is attached to the truck bed 12 via the rivets or spot weld 98. The upper strip 92 and lower strip 94 is joined together along a common shaft 96 which stands away from the truck cab 14 to allow clearance for the cab top 16 to fold over the forward face 18 of the truck bed 12. The shaft 96 is also of sufficient strength to support the weight of the cab top 16. Note also that the upper strip 92 is much narrower than the lower strip 94 due to its proximity to the rear window 44.

Concentrating on the remaining Figures, we see that once the cab top 16 has been lowered onto the truck bed 12 to become a jump seat 32, side snaps 100 which are attached to the inner side beds 31 to lock the jump seat 32 in place. This prevents the jump seat 32 from shifting and rattling while the convertible pickup truck 30 is in motion. Once locked in place, the jump seat 32 is fitted with a foam cushion 70. The foam cushion 70 comprises a seat rest 72, seat back 74 and is approximately 4 inches thick. This thickness affords comfort to passengers riding in the jump seat 32 and protection to the rear window 44. The foam cushion 70 is held in place by two snap swivels 78 located on the forward truck bed face 18 and matching straps 76 located on the foam cushion 70. When it is not in use, the foam cushion 70 is stored behind the front seat 25.

While passengers are seated in the jump seat 32, a padded safety bar 80 of approximately 1 inch steel tubing swings across the truck bed 12 to secure them in the jump seat 32. The safety bar 80 is swingable about pivot 84 to either position A, when not in use, or position B, when securing passengers in the jump seat 32. At either position, A or B, the safety bar 80 is held in place using the clamping mechanism 95.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents which may be resorted to fall within the scope of the invention.

What is claimed is:

1. A modification of the cab section of a pickup truck which facilitates the conversion of a two or three seat pickup truck into a four or five seat pickup truck convertible, wherein said modification comprises:

a cab top having a horizontally displaced outer surface, a vertically displaced inner and outer surface having a window disposed therein, a horizontally displaced inner surface having handle means disposed therein, said cab top having pivotable means at its rearward end to attach it to the front surface of a truck bed and having fastening means at its forward end to attach it to the top frame section of a windshield, said pivotable means allowing the cab top to become completely disposed within said truck bed such that it functions as a rearwardly facing jump seat, said jump seat having as its seat rest the horizontally displaced inner surface of the cab top and as its seat back the vertically displaced inner surface of the cab top, said jump seat having fastening means to secure it in place while disposed within the truck bed, said horizontally displaced outer surface of the cab top having a plurality of longitudinal buffer strips attached to and laterally displaced along its surface to prevent it from being defaced while disposed within the truck bed, said truck bed having a safety bar disposed therein, wherein said safety bar is pivotably connected to the inner surface of the truck bed, said safety bar having an initial position tangential to the inner surface of the truck bed and an alternate position transverse the inner surface of the truck bed and across the seat portion of the jump seat, said safety bar having latching means in both its initial and alternate positions.

2. An invention as set forth in claim 1 wherein said jump seat is padded with a cushion.

3. An invention as set forth in claim 2 wherein said cushion is secured to the truck bed.

4. An invention as set forth in claim 1 wherein said handle means aids in lowering the cab top into the truck bed.

5. An invention as set forth in claim 1 wherein said safety bar latching means are disposed within the side inner surface of the truck bed.

6. An invention as set forth in claim 1 wherein said jump seat fastening means is disposed within the inner side surface of the truck bed.

* * * * *